United States Patent [19]
Smith et al.

[11] Patent Number: 6,139,044
[45] Date of Patent: Oct. 31, 2000

[54] INTEGRATED BUMPER AND HITCH ASSEMBLY

[75] Inventors: Frank E. Smith, Battle Creek; Craig A. Harbour, Northville; Raymond T. Ueberroth, Clarksville; Jody M. Sullivan, Grand Rapids, all of Mich.

[73] Assignee: American Bumper & Mfg. Co., Ionia, Mich.

[21] Appl. No.: 09/092,760

[22] Filed: Jun. 5, 1998

Related U.S. Application Data

[60] Provisional application No. 60/069,074, Dec. 9, 1997.

[51] Int. Cl.$^7$ ........................................................ B60D 1/00
[52] U.S. Cl. ........................... 280/505; 280/500; 280/504; 293/117; 293/121
[58] Field of Search ..................................... 280/500, 505, 280/495, 501, 416.1, 504, 491.5, 507; 293/117, 116, 121

[56] References Cited

U.S. PATENT DOCUMENTS

| | | |
|---|---|---|
| D. 157,321 | 2/1950 | Barden . |
| D. 198,126 | 5/1964 | Cline . |
| D. 211,987 | 8/1968 | Zorn et al. . |
| 2,726,098 | 12/1955 | Krengel ................................... 280/500 |
| 3,578,358 | 5/1971 | Reynolds ................................. 280/500 |
| 4,738,464 | 4/1988 | Putnam ................................... 280/500 |
| 5,094,469 | 3/1992 | Yamamoto et al. ..................... 280/500 |
| 5,102,156 | 4/1992 | Fink et al. .............................. 280/495 |
| 5,364,142 | 11/1994 | Coiner ..................................... 293/117 |
| 5,489,111 | 2/1996 | Collins .................................... 280/495 |
| 5,511,813 | 4/1996 | Kravitz ..................................... 280/495 |
| 5,620,218 | 4/1997 | Saltzman et al. ....................... 293/117 |
| 5,628,536 | 5/1997 | Fulkerson ............................... 293/117 |

FOREIGN PATENT DOCUMENTS

| | | | |
|---|---|---|---|
| 1260512 | 9/1989 | Canada | ................................. 280/500 |
| 94/19205 | 9/1994 | WIPO | ..................................... 280/500 |

OTHER PUBLICATIONS

Exhibit A is an exploded, perspective view of a prior bumper assembly sold by the assignee of the present invention more than one year prior to the filing date of the present invention.

*Primary Examiner*—Daniel G. DePumpo
*Attorney, Agent, or Firm*—Van Dyke, Gardner, Linn & Burkhart, LLP

[57] ABSTRACT

An integrated bumper and hitch assembly is disclosed that integrates a bumper and a weight distributing hitch into a single unit. The integrated assembly includes a square, tubular socket for supporting and receiving a weight distributing hitch. A pair of outer struts are secured to a transverse arm at the corners of the bumper and hitch assembly. The outer struts support the corners of the bumper against vertical deflection and provide corner impact resistance. The bumper and hitch assembly includes three degree-of-freedom adjustability when attaching to a vehicle, thereby allowing the assembly to be properly aligned with the vehicle in three different directions. A cover over the hitch and another cover over the top of the bumper conceal the fasteners used to secure the assembly together and provide an overall pleasing exterior.

29 Claims, 6 Drawing Sheets

INTEGRATED BUMPER AND HITCH ASSEMBLY

This application claims priority to U.S. Provisional Patent Application Ser. No. 60/069,074, filed Dec. 9, 1997.

BACKGROUND OF THE INVENTION

The present invention relates generally to automotive type bumpers, and in particular to a combination trailer hitch and bumper assembly.

Automotive type trailer hitches come in a variety of different ratings and styles and can be used on a wide variety of different vehicles, including but not limited to, cars, trucks, vans, sport utility vehicles and others. In general, the different ratings refer to the load carrying capacity of the hitch. For purposes herein, the styles of trailer hitches can be divided into two broad categories: (1) weight distributing hitches, and (2) weight carrying hitches. These two types of hitches are further discussed in Society of Automotive Engineers ("SAE") publication J684, revised Mar. 21, 1994.

Weight distributing hitches are designed to distribute the weight of the trailer onto the towing vehicle by means of leverage applied between both the trailer and the towing vehicle. Weight distributing hitches can both pull a greater trailer weight and support a greater vertical weight than weight carrying hitches. In the past, weight distributing hitches have always required a square tubular socket for attaching the hitch to the vehicle. An example of one of these square, tubular sockets is disclosed in FIG. 2 of U.S. Pat. No. 5,628,536, issued to Fulkerson. Tubular socket 20 in FIG. 2 is part of a separate weight distributing hitch assembly 12. Hitch assembly 12 is a separate component from bumper 14 and is mounted underneath bumper 14. Socket 20 is capable of receiving either a weight distributing or a weight carrying hitch.

In the past, hitch mounts for supporting a weight distribution hitch have typically been separate from the bumper. The extra load carrying capacity of the weight distribution hitch has always required structural support beyond that traditionally incorporated into a bumper, thus necessitating a hitch mount separate from the bumper. Weight carrying hitches on the other hand, which carry smaller loads than weight distribution hitches, have been manufactured in the past integrated into the bumper. A person desiring to pull a relatively heavy trailer, or a person desiring to pull a trailer which otherwise required a mount for a weight distributing hitch, has thus always been forced in the past to pay the extra financial expense and the weight penalty of a separate hitch mount. The desirability of avoiding this extra expense and weight penalty is readily apparent.

Automobile manufacturers typically require that the bumpers used on their vehicles meet certain minimum structural requirements. Among these requirements are a specific degree of impact resistance at the corners of the bumper and elsewhere. The corners of the bumpers are also typically required to meet vertical deflection criteria. In other words, for a given weight placed on the corner of the bumper, the bumper is required to vertically deflect no more than a set amount. The bumper itself is typically not sufficiently strong to provide the required resistance to impacts by itself. Instead, structural members such as arms are often provided underneath the bumper (i.e. between the bumper and the vehicle) that provide further structural resistance to impacts. In the past, however, these structural members have not always extended the entire length of the bumper, thus leaving portions of the bumper with no structural reinforcement to resist impacts.

In addition to structural requirements, automobile manufacturers also typically require certain aesthetic standards for the bumpers they use on their vehicles. A bumper that does not have a visually pleasing exterior, such as one in which nuts and bolts are visible, is less desirable.

Due to the manufacturing imperfections, in both the vehicles and the bumpers, the precise alignment of the bumper with the vehicle is often not possible. The construction of the bumper may not allow it to be vertically positioned on the vehicle at the correct location, aligned with the sides of the vehicle, or fit tightly against the vehicle along its entire length.

An example of an integrated bumper and hitch assembly is disclosed in U.S. Pat. No. 4,738,464 issued to Putnam. The combined bumper and receiver trailer hitch assembly disclosed in Putnam suffers from several of the disadvantages discussed above. The combined bumper and receiver trailer hitch assembly does not include any internal structure at the corners of the assembly for providing corner impact resistance or vertical corner support. The bolts securing the bumper to the assembly are visible and aesthetically undesirable (See FIG. 4). Additionally, the receiver 11 is unconcealed and presents the visual appearance of being entirely separate from the bumper. Moreover, Putnam fails to disclose any method or structures for adjusting the alignment of the bumper with respect to the vehicle when it is attached to the vehicle.

The desirability of an integrated hitch and bumper assembly that overcomes these problems and meets the above criteria can therefore be seen.

SUMMARY OF THE INVENTION

A bumper and hitch assembly of the present invention overcomes the above-identified problems and meets the above-identified requirements. A bumper and hitch assembly according to the present invention includes a bumper and a weight distributing hitch. First and second arms extend from the hitch socket outwardly from the corners of the hitch and bumper assembly. Attached to each arm at each corner of the bumper and hitch assembly is an outer strut that attaches to and supports the bumper. A pair of mounting brackets are attached to the arms between the hitch socket and the ends of the arms.

According to another aspect of the present invention, a bumper and hitch assembly is provided which includes a bumper that extends in a longitudinal direction. A hitch socket is provided for receiving a weight distributing hitch. The hitch and bumper assembly further includes three adjustment mechanisms for adjustably attaching the bumper to the vehicle. The adjustments allow the bumper and hitch assembly to be adjusted in three direction vertically, parallel to the direction of motion of the vehicle (fore-aft), and transverse to the direction of motion of the vehicle.

According to yet another aspect of the present invention, a bumper and hitch assembly is provided that includes a bumper, a longitudinal member that extends between the corners of the assembly, and a tubular hitch socket adapted to support and receive a weight distributing hitch. An upper and lower center plate are attached to the longitudinal arm and the hitch socket. At least two mounting plates are secured to the longitudinal member and are used to attach at least two mounting brackets to the assembly. The mounting brackets are adapted to secure the bumper and hitch assembly to the vehicle. An inner and outer strut are attached to the longitudinal member and the bumper.

The bumper and hitch assembly of the present invention overcomes the need for a separate hitch mount when pulling heavy loads, or when a weight distributing hitch is otherwise required, by integrating the bumper and the hitch socket into a single entity. The integration of the hitch socket and the bumper into a single assembly in accordance with the present invention overcomes the need, including the associated costs, of adding a separate hitch socket to the vehicle. The integration of the hitch mount and bumper into a single assembly further results in a reduction in the weight and structure of the assembly when compared to the prior art separate bumper and hitch mounts. The hitch and bumper assembly includes a longitudinal arm that extends substantially the entire length of the bumper to provide internal structural reinforcement along substantially the entire length of the bumper, including the corners. The hitch and bumper assembly of the present invention provides as much resistance to vehicular impacts as past bumpers, including resistance against straight-on collisions and 30° corner collisions. The hitch and bumper assembly is also visually pleasing in that the fasteners and the internal structure of the hitch are concealed from view. The hitch and bumper assembly of the present invention also overcomes the problem of precise alignment with the vehicle due to manufacturing imperfections. The hitch and bumper assembly of the present invention can alternatively support a weight carrying hitch, if desired.

These and other advantages and features of the present invention will be apparent to one skilled in the art, in light of the following specification when read in conjunction with accompanying drawings.

DETAILED DESCRIPTION OF THE PREFERRED EMBODIMENTS

The present invention will now be described with reference to the accompanying drawings wherein like reference numerals correspond to like elements in the several drawings. An integrated hitch and bumper assembly 20 according to one embodiment of the present invention is depicted in partial view in FIGS. 1 and 2. For convenience of illustration, only approximately one half of the hitch and bumper assembly is illustrated with the understanding that the bumper and hitch assembly is symmetrical about a center hitch socket 42. Integrated hitch and bumper assembly 20 is adapted to both function as a bumper and provide a mount for a weight distributing hitch. The hitch socket or mount 42 of bumper and hitch assembly 20 can also support a weight carrying hitch, if desired. Bumper and hitch assembly 20 includes a front side 24 that faces a vehicle (not shown) to which the bumper and hitch assembly is mounted. A rear side 26 faces away from the vehicle and is visible to motorists traveling behind the vehicle. Bumper and hitch assembly 20 further includes a top 28 and a bottom 30.

Figure 2:
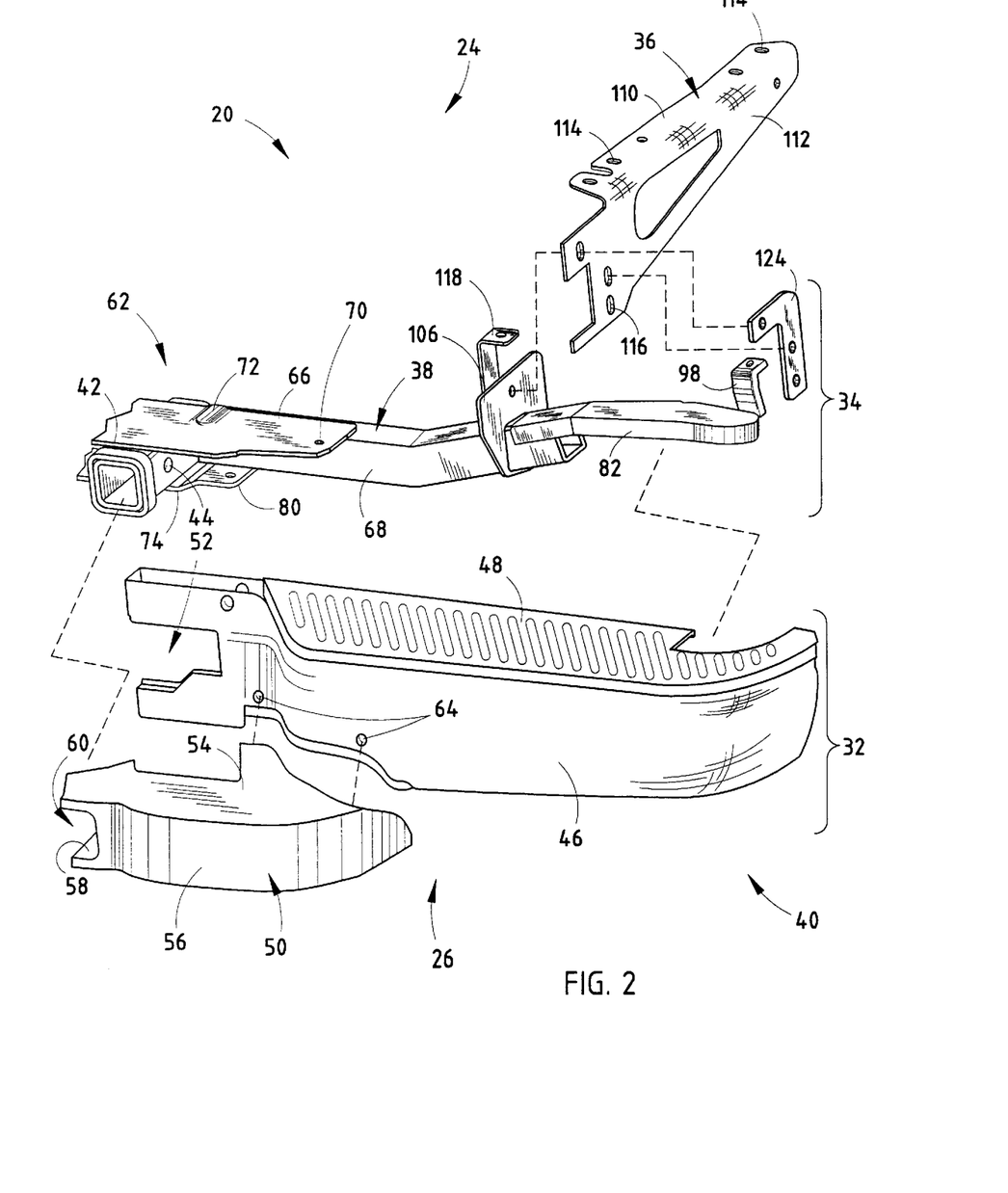
FIG. 2 is a rear, partial, exploded, perspective view of the bumper and hitch assembly of FIG. 1.

Bumper and hitch assembly 20 includes a bumper assembly 32 and a hitch assembly 34 (FIG. 2). Hitch assembly 34 is mounted to the vehicle by way of a pair of mounting brackets 36 (only one shown) that extend underneath the vehicle. Mounting brackets are attached to a longitudinal member or arm 38 that extends transversely to mounting brackets 36 from a first corner 40 to a second corner (not shown) of bumper and hitch assembly 20. A tubular hitch socket 42 is mounted to arm 38 generally in its center midway between the corners of bumper and hitch assembly 20. Hitch socket 42 defines a rectangular opening that extends in a direction parallel to the direction of motion of the vehicle (and transverse to arm 38). Hitch socket 42 is designed to receive a standard hitch bar for a weight distributing hitch. Alternatively, a weight carrying hitch can be inserted into socket 42, if desired. Hitch socket 42 includes a transverse opening 44 through which a pin (not shown) is inserted to secure a hitch bar in hitch socket 42.

Figure 1:
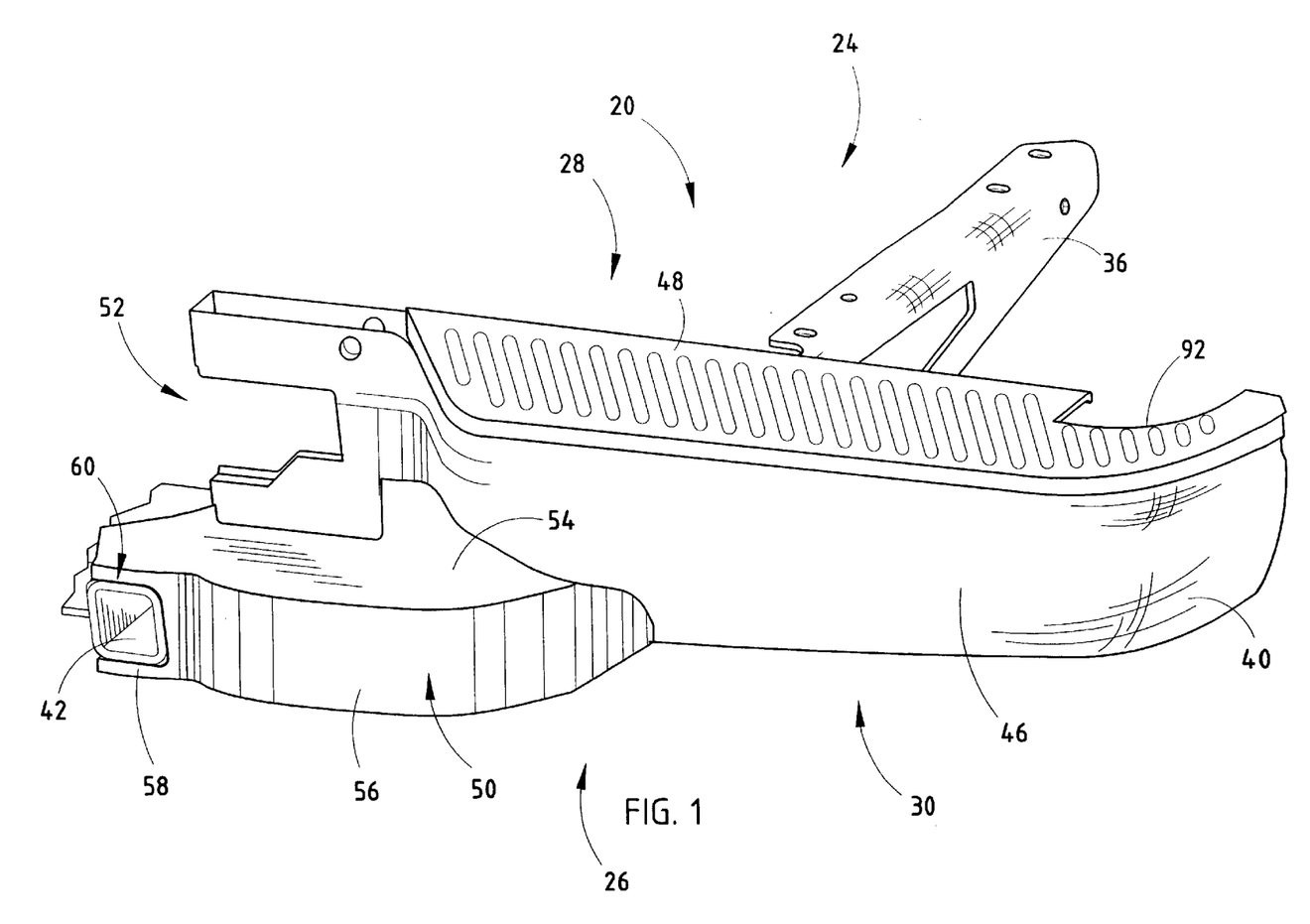
FIG. 1 is a rear, partial, perspective view of an integrated bumper and hitch assembly according to one aspect of the present invention.

Bumper assembly 32 (FIG. 2) includes a bumper 46, a top cover 48, and a hitch cover 50. Top cover 48 is designed to be snap fit onto top 28 of bumper 46. The snap fit is achieved by a series of projections extending downwardly from top cover 48 (not shown) that snap fit into a series of corresponding apertures is the top of bumper 46 (not shown). The snap fit of top cover 48 allows top cover 48 to be secured to bumper 46 without any externally visible fasteners. Bumper 46 is a single piece that extends from corner to corner of the vehicle. At its center, bumper 46 defines a license plate area 52 for attaching a license plate. Hitch cover 50 is preferably made of a durable plastic material sufficiently strong to withstand scuffing and standing on. Hitch cover 50 includes a top wall 54, a vertical rear wall 56, and a bottom wall 58. Vertical rear wall 56 defines a square aperture 60 corresponding in size to hitch socket 42. Hitch socket 42 fits into square aperture 60 of hitch cover 50 when assembled (FIG. 1). Top wall 54 extends from vertical wall 56 to bumper 46 and is shaped to tightly abut against bumper 46 along its entire length. Bottom wall 58 extends only a small fraction of the way from vertical wall 56 toward bumper 46. The extent of bottom wall 58 toward bumper 46 is sufficient to provide visually acceptable concealment of a center region 62 of hitch assembly 34 and yet short enough to allow a user to reach under hitch cover 50 and gain access to transverse opening 44 in hitch socket 42 to secure a hitch bar in hitch socket 42. Hitch cover 50 is secured to bumper 46 by four projections or prongs (not shown) that snap fit into receiving holes 64 (only two depicted) in bumper 46 (FIG. 2). In this way, hitch cover 50 is secured without any externally visible fasteners. Hitch cover 50 conceals from normal view all of hitch socket 42 except for its interior into which a hitch bar may be inserted. Hitch cover 50 also conceals from normal view center region 62 of hitch assembly 34. Hitch cover 50 thereby provides an aesthetically pleasing appearance to bumper and hitch assembly 20.

Center region 62 of hitch assembly 34 (FIGS. 3 and 4) includes an upper center plate 66 disposed above and on top of hitch socket 42 and longitudinal member or arm 38. Upper center plate 66 serves to both secure hitch socket 42 to arm 38, which comprises a pair of bars 68 disposed on either side of socket 42, and to provide sufficient structural support to hitch cover 50 to allow a person to stand on hitch cover 50. Upper center plate 66 further defines a pair of holes 70 (FIGS. 2–4; only one shown) through which a bolt is inserted into a corresponding hole in the underside of bumper 46. Bumper 46 is thereby secured to upper center plate 66 in a manner not visible to an observer. Upper center plate 66 further includes a pair of raised humps 72 (only one shown) that are disposed above each of the junctions of bars 68 with hitch socket 42. Humps 72 provide space for any uneven welding between hitch socket 42 and bars 68.

Center region 62 of hitch assembly 34 further includes a lower center plate 74 (FIGS. 3, 4, 10, and 11) that is disposed underneath hitch socket 42. Lower center plate 74 extends from one bar 68 to the opposite bar 68 across the bottom of hitch socket 42. Lower center plate 74 includes a lowered center portion 76 that accommodates the height disparity between hitch socket 42 and bars 68. Lowered center portion 76 contacts and is welded to the underside of hitch socket 42. A pair of raised ends 78 of lower center plate 74 contact and are welded to bars 68. Lower center plate 74 further defines a pair of holes 80 (FIGS. 2–4 and 11) for attachment of one or more safety chains between the vehicle and whatever is being towed by the vehicle.

Longitudinal member or arm 38 comprises bars 68 and an extension 82 secured at the outer ends of bars 68 (FIGS. 1–7). Bars 68 are square, hollow bars that include a straight portion 84 and an upwardly angled portion 86. Straight portion 84 is mounted at its end to hitch socket 42. Angled portions 86 are mounted at their ends to extensions 82.

Figures 5, 6:
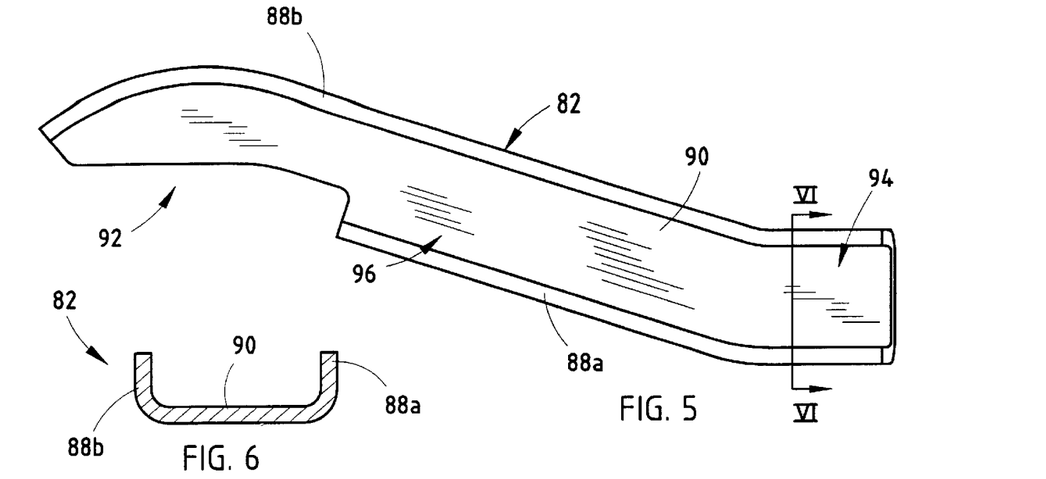
FIG. 5 is a plan view of the underside of an extension of the bumper and hitch assembly of FIG. 1.
FIG. 6 is a sectional view of the extension taken along the line VI—VI in FIG. 5.
Figures 7, 8, 9:
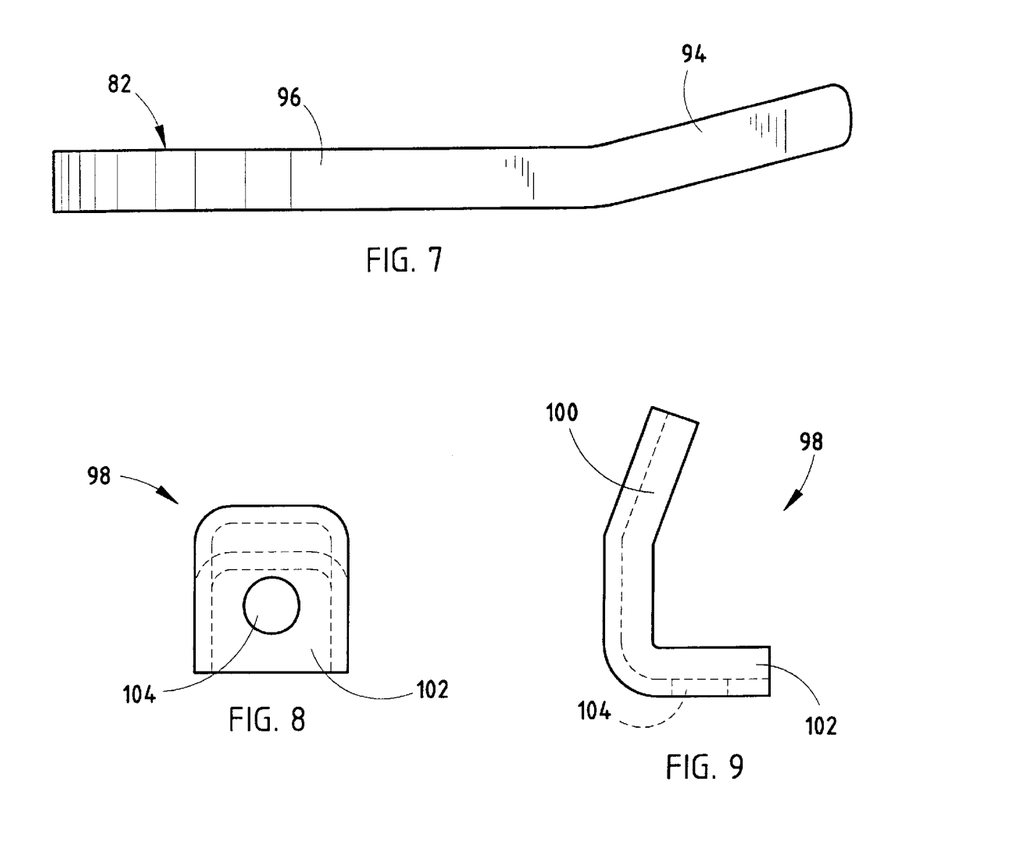
FIG. 7 is an elevational view of the extension of the bumper and hitch assembly of FIG. 1.
FIG. 8 is a plan view of an outer strut of the bumper and hitch assembly of FIG. 1.
FIG. 9 is an elevational view of the outer strut of FIG. 8.
Figure 10:
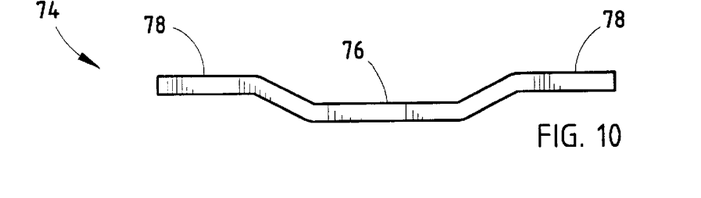
FIG. 10 is an elevational view of a lower center plate of the bumper and hitch assembly of FIG. 1.
Figure 11:
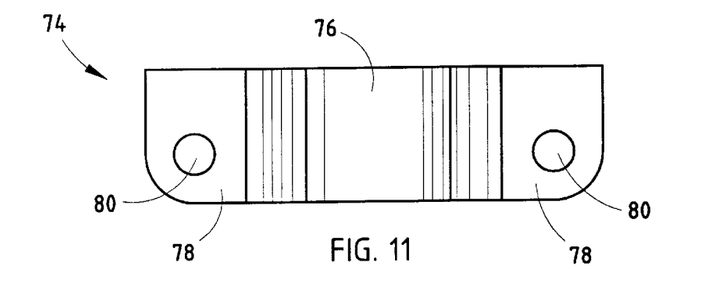
FIG. 11 is a plan view of the lower center plate of FIG. 10.

Extensions 82 include a pair of sidewalls 88a and b that are joined by a top wall 90 (FIGS. 5–6). Sidewalls 88a and b extend along substantially the entire length of extension 82 except for a rear corner portion 92. Rear corner portion 92 is shaped to conform to the corner of the vehicle. Extension 82 also includes an angled section 94 and a straight section 96. Angled section 94 attaches to angled portion 86 of bars 68. Top wall 90 and sidewalls 88a and b are dimensioned to fit over bar 68. Extensions 82 extend to the corners of the vehicle and provides sufficient corner impact resistance to meet the standards of most automobile manufacturers.

Attached to each extension 82 at its rear corner portion is an outer vertical strut 98 (FIGS. 2–4, 8, and 9). Outer struts 98 include bottom ends 100 that are welded to extensions 82. Outer struts 98 provide support for bumper 46 at its corners. Outer struts 98 further include flat top sections 102 that define an aperture 104 through which a bolt is inserted for securing bumper 46 to outer struts 98. The bolt fastening of outer struts 98 to bumper 46 is concealed from view by the placement of top cover 48 over bumper 46, as described earlier. Outer struts 98 in the current embodiment provide sufficient vertical support to bumper 46 to limit the vertical deflection of bumper 46 at its corners to 15 millimeters when a weight of 200 lbs. is applied on the corners.

Figure 3:
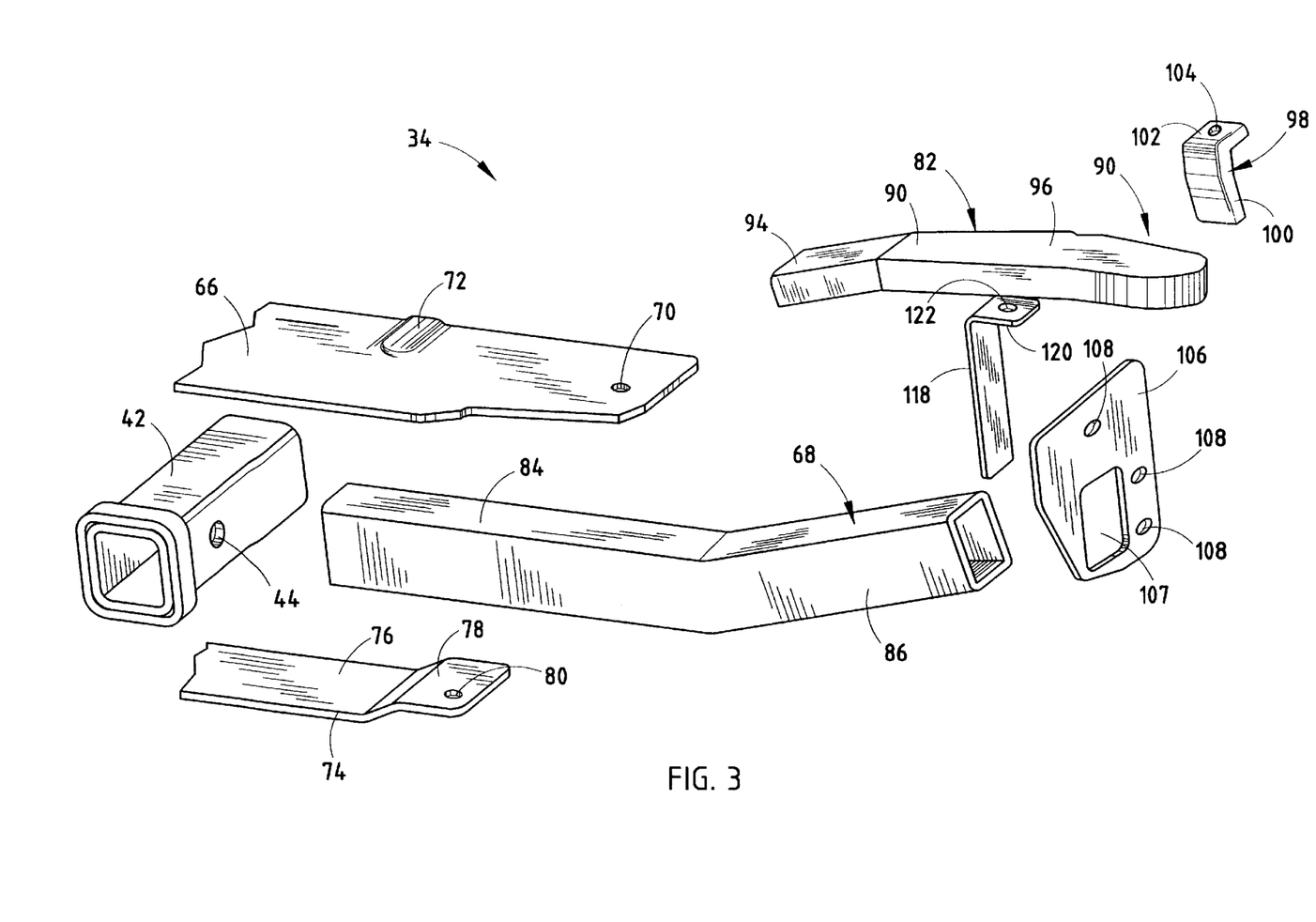
FIG. 3 is a rear, partial, exploded, perspective view of the hitch assembly of FIG. 1.
Figure 4:
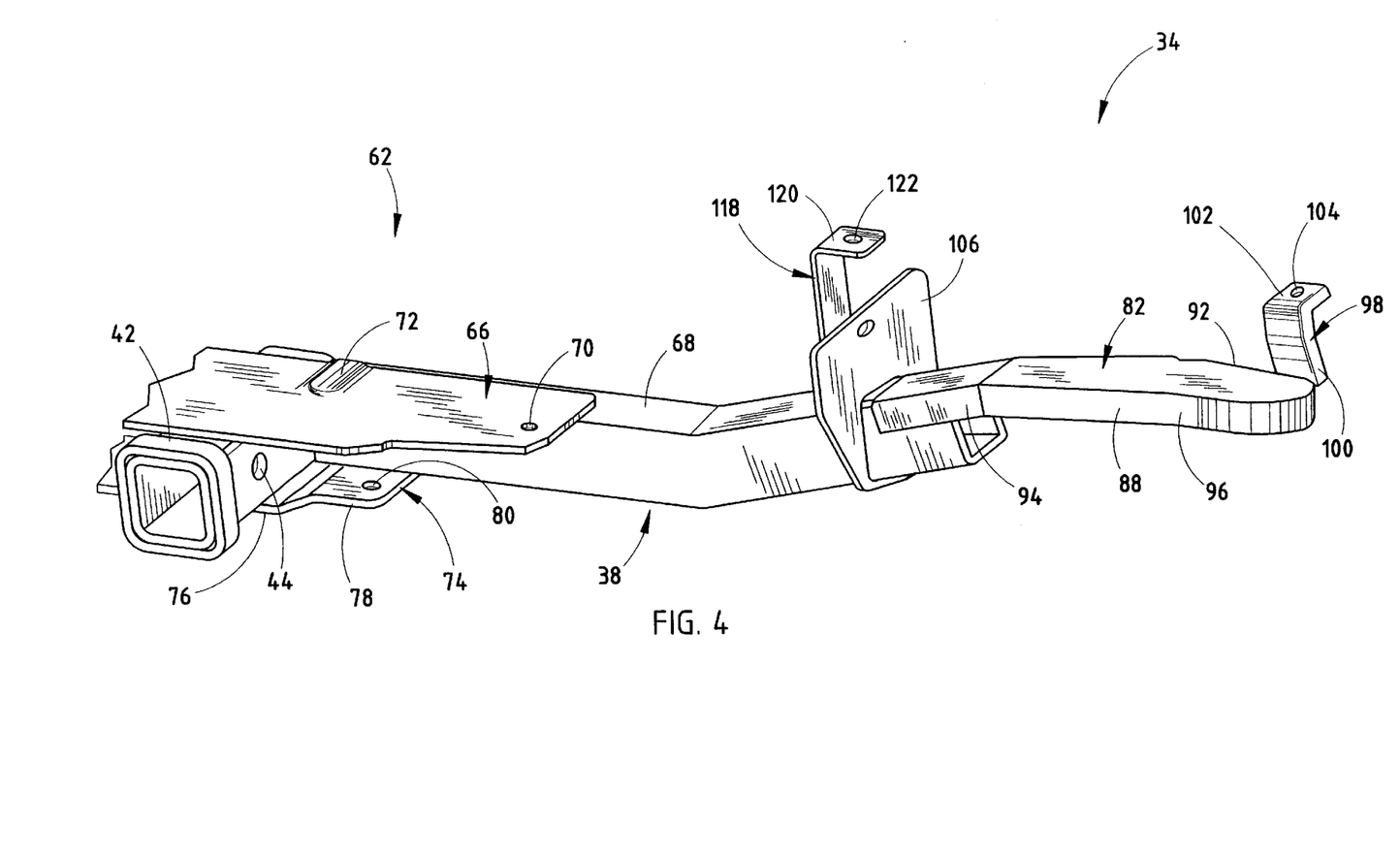
FIG. 4 is a rear, partial, perspective view of the hitch assembly of FIG. 1.

A mounting plate 106 is attached to bars 68 adjacent the junction of extensions 82 and bars 68 (FIGS. 2–4). Mounting plates 106 each include a square aperture 107 dimensioned to receive bars 68 (FIG. 3). Mounting plates 106 define three elongated slots 108 through which bolts are inserted for attachment to mounting brackets 36. Elongated slots 108 are elongated horizontally in a direction parallel to the direction of motion of the vehicle (i.e. a fore-aft direction). Elongated slots 108 allow hitch and bumper assembly 20 to be attached to the vehicle with a plurality of different spacings between the vehicle and the hitch and bumper assembly. After a bolt is inserted in the elongated slot, the hitch and bumper assembly is moved to tightly abut against the vehicle along its entire length. Then the bolt is tightened, thereby securing the hitch and bumper assembly at the precisely desired closeness to the vehicle.

Mounting brackets 36 include a flat, top wall 110 and a side wall 112 that extends perpendicularly downward from a side of top wall 110 (FIGS. 1, 2, 12, and 13). Top wall 110 defines a plurality of side-to-side elongated slots 114 through which bolts are inserted for attaching the mounting brackets to the vehicle. The elongation of slots 114 allows the side-to-side position bumper and hitch assembly 20 with respect to the vehicle to be adjusted. In other words, if one corner of bumper and hitch assembly 20 extended slightly past the corner of the vehicle due to a manufacturing imperfection, this could be compensated for by moving the bumper and hitch assembly 20 in a side-to-side direction. Thereafter the bolts in elongated slots 114 would be tightened to secure bumper and hitch assembly 20 with the proper alignment of the sides of the vehicle.

Figure 12:
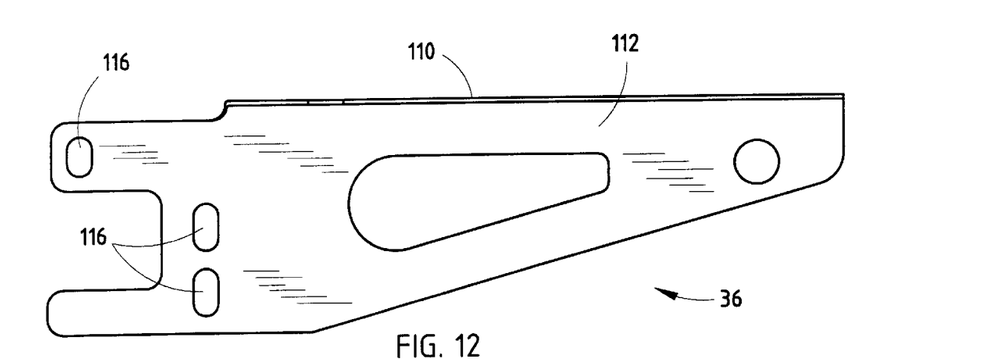
FIG. 12 is an elevational view of a mounting bracket of the bumper and hitch assembly of FIG. 1.
Figure 13:
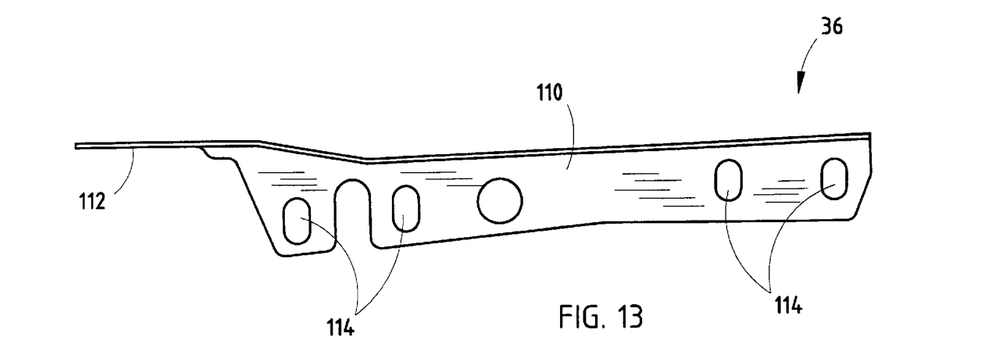
FIG. 13 is a plan view of the mounting bracket of FIG. 12.

Side walls 112 of mounting brackets 36 define a plurality of vertically elongated slots 116 through which bolts are inserted for attaching mounting brackets 36 to mounting plates 106 (FIG. 12). Vertically elongated slots 116 allow bumper and hitch assembly 20 to be attached to the vehicle at a plurality of different heights. The height of bumper and hitch assembly 20 can therefore be adjusted to fit on the vehicle precisely as desired. Vertically elongated slots allow for height adjustment in the same manner as side-to-side elongated slots 114 and horizontal (fore-aft) elongated slots 108. Bolts are inserted through slots 116 and the height of bumper and hitch assembly 20 is then adjusted as desired. The bolts are then tightened to secure the bumper and hitch assembly onto the vehicle at the proper height.

An inner strut 118 is attached to each mounting plate 106 (FIGS. 2–4). Inner strut 118 includes a flat, top section 120 that defines an aperture 122 through which a bolt is inserted for securing bumper 46 to inner strut 118. The bolt inserted through aperture 122 is concealed by top cover 48.

An L-shaped anchor plate 124 is attached to mounting brackets 36 on a side facing the corners of the bumper and hitch assembly (FIG. 2). Anchor plates 124 are secured to mounting brackets 36 by the same bolts passing through vertically elongated slots 116 in mounting brackets 36. These bolts pass through three non-elongated apertures 126 in anchor plate 124 that correspond in position to elongated slots 116. Anchor plate 124 serves to better secure mounting brackets 36 to mounting plate 106.

All of the materials of bumper and hitch assembly 20 are made of steel, or other suitably strong material, except for top cover 48 and hitch cover 50 in the current embodiment. Top cover 48 and hitch cover 50 may be made of a plastic or rubbery type material or any other suitable material. All parts of bumper and hitch assembly 20 are welded together unless otherwise indicated. Various modifications can be made to the disclosed embodiment without departing from the invention. As one example, arm 38 can alternatively be a single piece structure that is disposed behind, above, or below hitch socket 42.

While the present invention has been described in terms of the preferred embodiments depicted in the drawings and discussed in the above specification, it will be understood by one skilled in the art that the present invention is not limited to these particular preferred embodiments, but includes any and all such modifications that are within the spirit and scope of the present invention as defined in the appended claims.

The embodiments of the present invention in which an exclusive property or privilege is claimed are defined as follows:

1. A bumper and hitch assembly for attaching to a vehicle, comprising:
   a bumper;
   a weight distributing hitch socket;
   a first arm attached to said hitch socket and oriented transversely to said hitch socket, said first arm extending from said hitch socket to a first end adjacent a first corner of said bumper assembly;
   a second arm attached to said hitch socket and oriented transversely to said hitch socket, said second arm extending from said hitch socket to a second end adjacent a second corner of said bumper assembly;
   a first outer strut attached to said first arm at said first end of said first arm, said first outer strut adapted to attach to and support said bumper and provide increased resistance to impacts;
   a second outer strut attached to said second arm at said second end of said second arm, said second outer strut adapted to attach to and support said bumper and provide increased resistance to impacts; and,
   a pair of mounting brackets, each said mounting bracket attached to said arm between said hitch socket and said ends of said arm, said mounting brackets adapted to secure said bumper assembly to the vehicle.

2. The bumper and hitch assembly of claim 1 wherein each of said mounting brackets defines at least one side-to-side elongated slot through which a fastener is inserted for securing said brackets to the vehicle, each of said side-to-side elongated slots being elongated in a direction parallel to the extension of said first and second arms.

3. The bumper and hitch assembly of claim 1 wherein each of said mounting brackets defines at least one vertically elongated slot through which a fastener is inserted for securing said brackets to said first and second arms.

4. The bumper and hitch assembly of claim 1 further including a first mounting plate attached to said first arm and one of said mounting brackets, said first mounting plate defining at least one fore-aft elongated slot through which a fastener is inserted for securing said first mounting plate to said mounting bracket, said fore-aft elongated slot elongated in a direction parallel to the direction of motion of the vehicle.

5. The bumper and hitch assembly of claim 1 further including a hitch cover adapted to conceal from view all of said hitch socket except for an interior portion of said hitch socket which receives a hitch bar.

6. The bumper and hitch assembly of claim 5 further including an upper center plate attached to said hitch socket and each of said arms, and a lower center plate attached to said hitch socket and each of said arms.

7. The bumper and hitch assembly of claim 6 wherein said hitch cover is attached to said bumper.

8. The bumper and hitch assembly of claim 7 wherein said hitch cover is attached to said bumper by fasteners that are concealed from view by said hitch cover.

9. The bumper and hitch assembly of claim 1 wherein said bumper is attached to said first and second outer struts by a fastener concealed from view by said bumper.

10. The bumper and hitch assembly of claim 1 wherein said first and second arms each comprises a bar and an extension attached to said bar, said bar attached to said hitch socket and said extension attached to said bar at an end opposite said hitch socket.

11. A bumper and hitch assembly for attachment to a rear end of a vehicle, comprising:
   a bumper extending in a longitudinal direction transverse to the direction of motion of the vehicle;
   a hitch socket adapted to receive a weight distributing hitch bar;
   a height adjustment mechanism adapted to allow said hitch socket to be attached to the rear end of the vehicle at a plurality of different heights;
   a fore-aft adjustment mechanism adapted to allow said hitch socket to be attached to the vehicle at a plurality of different locations that extend toward and away from the rear end of the vehicle whereby the distance of the hitch socket from the rear end of the vehicle can be adjusted; and,
   a side-to-side adjustment mechanism adapted to allow said hitch socket to be attached to the vehicle at a plurality of different locations that extend in a direction parallel to the longitudinal direction of said bumper.

12. The bumper and hitch assembly of claim 11 wherein said hitch socket is sandwiched between a pair of longitudinally extending arms.

13. The bumper and hitch assembly of claim 12 wherein said pair of longitudinally extending arms extend from a first corner of said bumper to a second corner of said bumper.

14. The bumper and hitch assembly of claim 12 further including an upper center plate attached to, and extending across, said hitch socket and said pair of longitudinally extending arms.

15. The bumper and hitch assembly of claim 14 further including a hitch cover attached to said bumper, said hitch cover adapted to conceal said upper center plate and all of said hitch socket from view except for an interior portion which receives a hitch bar.

16. The bumper and hitch assembly of claim 15 wherein said hitch cover is made of plastic.

17. The bumper and hitch assembly of claim 16 further including a lower center plate attached to, and extending under, said hitch socket and said pair of longitudinally extending arms.

18. The bumper and hitch assembly of claim 11, wherein said height adjustment mechanism comprises vertically elongated slots defined in at least one mounting bracket adapted to mount said bumper and hitch assembly to the vehicle.

19. The bumper and hitch assembly of claim 18, wherein said fore-aft adjustment mechanism comprises elongated slots defined in a mounting plate adapted to be attached to said mounting bracket, said elongated slot elongated in a direction parallel to the direction of motion of the vehicle.

20. The bumper and hitch assembly of claim 19, wherein said side-to-side adjustment mechanism comprises elongated slots defined in said at least one mounting bracket, said elongated slots elongated in a direction transverse to the direction of motion of the vehicle.

21. A bumper and hitch assembly for a vehicle that extends across a rear end of a vehicle from one rear corner of the vehicle to another rear corner of the vehicle, comprising:
   a bumper;
   a longitudinal member extending from one of said corners to the other of said corners said longitudinal member positioned inside of said bumper;

a tubular hitch socket adapted to receive a weight distributing hitch, said tubular hitch socket oriented perpendicularly to said longitudinal member and positioned midway between said corners;

an upper center plate mounted on top of said tubular hitch socket and attached to said longitudinal member;

a lower center plate mounted underneath said tubular hitch socket and attached to said longitudinal member;

at least two spaced apart mounting plates attach to said longitudinal member;

a mounting bracket attached to each mounting plate, said mounting bracket adapted to be attached to said vehicle;

an inner strut attached to each mounting plate and said bumper; and, an outer strut attached to said longitudinal member and said bumper adjacent each of said corners of said vehicle, said outer struts providing said bumper with increased resistance to impacts at the corners of the bumper.

22. The bumper and hitch assembly of claim 21 further including a hitch cover that conceals from view both said upper center plate and said lower center plate.

23. The bumper and hitch assembly of claim 21 wherein said bumper assembly is adapted to be adjustably attached to the vehicle in a vertical direction, a horizontal direction parallel to said longitudinal member, and a horizontal direction transverse to said longitudinal member.

24. A bumper and hitch assembly for a vehicle comprising:

a longitudinally extending bumper having first and second corners;

a weight distributing hitch socket disposed between said first and second corners of said bumper;

a longitudinally extending arm disposed between said bumper and the vehicle, said longitudinally extending arm oriented parallel to said bumper, said longitudinally extending arm dimensioned to extend all the way from a position adjacent said first corner of said bumper to a position adjacent said second corner of said bumper whereby said longitudinally extending arm provides resistance to impacts along substantially the entire length of said bumper, including said corners of said bumper.

25. The bumper and hitch assembly of claim 24 further including a first and second outer strut, said first outer strut attached to said longitudinally extending arm and said bumper at said first corner, said second outer strut attached to said longitudinally extending arm and said bumper at said second corner.

26. The bumper and hitch assembly of claim 25 wherein said bumper has a top and a bottom side and said first and second outer struts attach to said top side of said bumper.

27. The bumper and hitch assembly of claim 26 further including an upper and a lower center plate, said upper center plate attached on top of said longitudinally extending arm and said weight distributing hitch socket.

28. The bumper and hitch assembly of claim 27 wherein said lower center plate defines a pair of apertures for attaching a chain to said lower center plate.

29. The bumper and hitch assembly of claim 28 wherein said longitudinally extending arm comprises a pair of bars and a pair of extensions.

* * * * *